United States Patent [19]

Steiger

[11] 4,260,320

[45] Apr. 7, 1981

[54] SAFETY DEVICE FOR A FRONT END TYPE LOADER VEHICLE

[75] Inventor: Bruce W. Steiger, Thief River Falls, Minn.

[73] Assignee: Hydra-Mac, Inc., Thief River Falls, Minn.

[21] Appl. No.: 47,056

[22] Filed: Jun. 11, 1979

[51] Int. Cl.³ .............................................. B65D 45/30
[52] U.S. Cl. .................................. 414/680; 280/756; 296/102; 414/713
[58] Field of Search ................ 296/102, 190; 280/756; 212/59 A; 298/17 B; 172/466, 481; 414/713, 715, 706, 710, 546, 680

[56] References Cited

U.S. PATENT DOCUMENTS 3,995,761  12/1976  Hurlburt .............................. 414/713

Primary Examiner—Robert B. Reeves
Assistant Examiner—Douglas D. Watts
Attorney, Agent, or Firm—Williamson, Bains, Moore & Hansen

[57] ABSTRACT

A self-propelled vehicle includes a vehicle body having a forwardly facing operator's compartment or cab. The vehicle is provided with a front end implement which is controlled by vertically swingable lift arms that extend along the sides of the operator's compartment. A pair of safety gates are pivotally mounted on the front portion of the vehicle body and prevent an operator from being thrown from the operator's compartment when the gates are in the closed position. The gates also obstruct vertical movement of the lift arms when the gates are in the open position.

6 Claims, 3 Drawing Figures

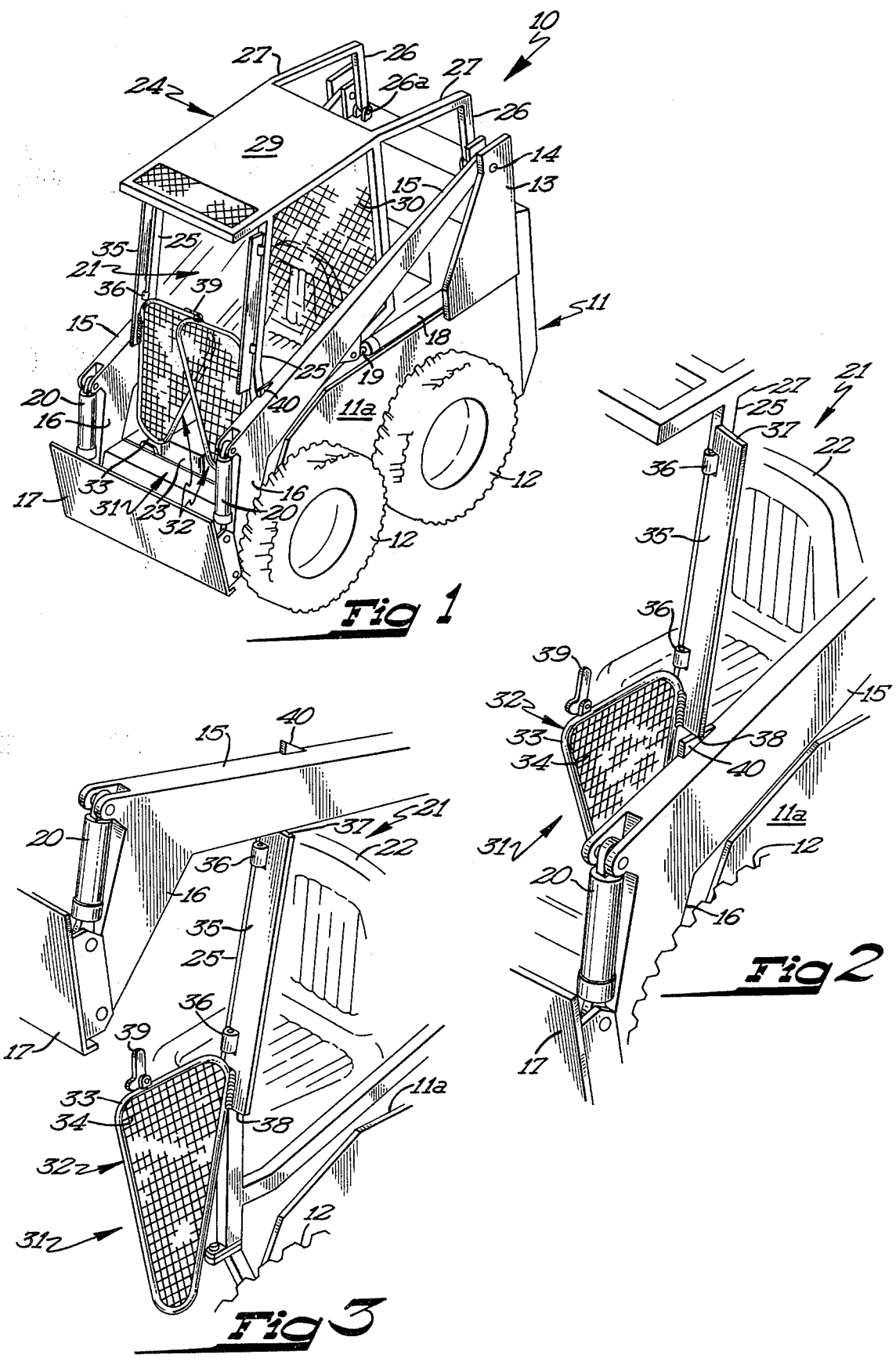

SAFETY DEVICE FOR A FRONT END TYPE LOADER VEHICLE

SUMMARY OF THE INVENTION

This invention relates to self-propelled vehicles having lift arms for controlling a front end implement, and more particularly to a safety device for such vehicles.

In many off highway vehicles, a front end implement is provided which is controlled by lift arms that extend alongside the operator's compartment. Safety belts or harnesses are provided for the operator and the sides of the cab or operator's compartment are usually provided with protective screens for protecting the operator from injury by movement of the lift arms. However, when an operator enters or leaves the operator's compartment, there is always the potential danger of the operator inadvertently moving the actuator controls for the lift arms which can result in injury to the operator.

It is therefore a general object of this invention to provide a front end type loader vehicle with a safety device which not only prevents the operator from being thrown from the operator's compartment during operation of the vehicle, but also serves to prevent vertical movement of the lift arms when the operator is entering or leaving the operator's compartment.

More specifically, it is an object of this invention to provide a novel safety gate device for front end type loader vehicles wherein the safety gate device when in the closed position prevents the operator from being thrown forwardly from the operator's compartment, and when in the open position, obstructs vertical movement of the lift arms thereby precluding injury to the operator when entering or leaving the vehicle.

These and other objects and advantages of this invention will more fully appear from the following description made in connection with the accompanying drawings, wherein like reference characters refer to the same or similar parts throughout the several views.

FIGURES OF THE DRAWINGS

FIG. 1 is a front perspective view of a front end type vehicle incorporating the novel safety device and illustrating the safety device in the closed position with the vehicle lift arms in a lowered position;

FIG. 2 is a fragmentary perspective view of the vehicle illustrating a gate device in an open position and disposed in obstructing relation with respect to the vehicle lift arms when the latter are in a lowered position; and FIG. 3 is a fragmentary front perspective view of a portion of a vehicle illustrating the gate device in the open position and disposed in obstructing relation with respect to the lift arms when the latter are in the raised position.

DESCRIPTION OF THE PREFERRED EMBODIMENT OF THE INVENTION

Referring now to the drawings and more particularly to FIG. 1, it will be seen that one embodiment of a front end loader type vehicle, designated generally by the reference numeral 10, is thereshown. Although my novel safety device may be used in various kinds of off highway vehicles that have front end implements controlled by lift arms, in the embodiment illustrated, the safety device is incorporated on a commercial skid steer front end loader. The vehicle 10 includes a vehicle body 11 having front and rear ends and having ground engaging propulsion wheels 12. Since the vehicle illustrated in a skid steer type loader, the power plant for the vehicle is located at the rear end portion of the body. The vehicle body 11 is also provided with a pair of upright stanchions or posts 13 adjacent the rear end thereof to which are pivoted lift arms 15 by pivots 14. The lift arms extend forwardly and downwardly from their pivot connection with the upright stanchions 13 and are provided with downwardly extending portions 16 located adjacent the front end of the vehicle body. The downwardly extending portions 16 are pivotally connected to a conventional implement 17.

Means are provided for raising and lowering the lift arms 15 about a horizontal transverse axis and this means includes a pair of hydraulic cylinders 18 each being pivotally mounted on the body 11 and projecting forwardly therefrom, as best seen in FIG. 1. Each hydraulic cylinder is provided with a piston rod 19 which is connected to the associated lift arm intermediate the ends of the latter.

The lift arms 15 are also provided with a pair of hydraulic cylinders 20 adjacent the front ends thereof which extend along the downwardly extending portions 16 and are connected to the implement 16 to permit pivoting of the implement about the horizontal transverse axis. The hydraulic cylinders 18 and 20 are respectively connected to a source of hydraulic fluid under pressure whereby when the piston rods are extended and retracted, the lift arms may be raised and lowered and the implement may be pivoted relative to the lift arms. The features described hereinabove are of conventional construction and do not, per se, constitute part of the present invention. The vehicle 10 is also provided with an operator's compartment 21 which is located intermediate the ends of the vehicle body and which faces forwardly. The operator's compartment is provided with an operator's seat 22 which is positioned just rearwardly of a control box 23, the latter including control actuators for controlling operation of the hydraulic cylinders 18 and 20 as well as controlling operation of the propulsion wheels 12.

The vehicle 10 is also provided with a cab 24 which is intended to protect the operator while the operator is operating the vehicle. The cab 24 includes a pair of laterally spaced apart front vertical frame elements 25 each being affixed at its lower end to a suitable brackets 25a secured to the inner surfaces of the side walls 11a of the vehicle body. The cab also includes a pair of rear vertical frame elements 26 which project upwardly adjacent from the rear of the body and are secured to suitable brackets 26a. Longitudinal frame elements 27 interconnect the front and rear vertical frame elements of the cab and a transverse frame element 28 interconnects the longitudinal frame elements adjacent their respective front ends. A top 29 is secured to the longitudinal frame elements 27 and suitable side screens 30 are secured to the vertical and longitudinal frame elements. The side screens 30 are primarily intended to protect the operator from injury while the operator is seated in the operator's compartment during raising and lowering of the lift arms 15.

In most front end loader type vehicles, the operator must enter and leave the vehicle through the front end. The operator in entering and leaving the vehicle must also traverse the space or area in which the control mechanism for the vehicle is located such as the control box 23. The potential for danger presented by this mode of entry in front end type loader vehicles is the chance occurrence of the operator inadvertently moving one of the actuator controls especially those that control raising and lowering the lift arms 15. In some instances, the lift arms may be in an elevated position when the operator interrupts operation of the vehicle and exits from the operator's compartment. In other instances, the lift arms may be in the lowered position when the operator leaves the vehicle. However, regardless of the position of the lift arms when the operator leaves or enters the vehicle compartment, any accidental movement of the lift arms could result in injury to the operator.

Therefore, a safety device 31 is provided which not only prevents the operator from being thrown forwardly from the vehicle during operation of the vehicle, but the safety device also prevents vertical movement of the lift arms when the operator enters or exits from the operator's compartment. The safety device 31 includes a pair of similar gate members 32 each including a tubular generally oval frame 33, each frame having a screen 34 secured thereto. Each gate member 32 is welded or otherwise rigidly secured to an elongate generally rectangular stop plate 35. Each stop plate 35 is secured adjacent its inner vertical edge by hinges 36 to the adjacent vertical frame element 35. It will be noted that the gate members 32 and the stop plates 35 are vertically oriented. It will also be noted that each gate member 32 is disposed in substantially normal relation with respect to its associated stop plate 35. Each gate member and its associated stop plate 35 is adapted to swing through an arc of approximately 90° from a fully opened position, as illustrated in FIGS. 2 and 3, to a fully closed position as illustrated in FIG. 1.

It will be noted that when the gate members 32 are in the fully closed position, the upper inner portions of the gate members are disposed in overlapped relation. The gate members therefore completely obstruct the front entry way with respect to the operator's compartment. With this arrangement, the operator cannot be thrown forwardly from the vehicle during operation of the vehicle. It will also be noted that when the gate members are in the closed position, the stop plates 35 are disposed substantially parallel to the lift arms 15 and are disposed substantially parallel to the general longitudinal axis of the vehicle. A suitable latch member 39 is provided for releasably latching the gate members in the closed position.

When the gate members are in the fully opened position, the gate members 32 project forwardly of the vehicle body and are disposed in substantially parallel relation with respect to the lift arms 15 and the generally longitudinal axis of the vehicle. However, the stop plates 35 are disposed in substantially right angular or normal relation to the lift arms 15.

Referring now to FIG. 2, it will be noted that when the lift arms 15 are in the lowered position and the gate members 32 are in the open position, the lower edge 38 of each gate member will overlie and be disposed in obstructing relation with respect to the adjacent lift arms 15. In the embodiment shown, a suitable plate engaging block or pad 40 is positioned on the upper surface of each lift arm to provide a planar contacting surface for the lower edge 38 of the associated rectangular stop plate. In this regard, it is pointed out that each stop plate 35 has a width dimension of sufficient magnitude to project into the path of the lift arms and thereby obstruct vertical movement of the lift arm when the gate members are in the open position.

Referring now to FIG. 3, it will be noted that the lift arms 15 are in the raised position and the gate members 32 are in the open position. Again, it will be noted that the stop plates 35 are disposed in obstructing relation with respect to the lift arm whereby the upper edge 37 will be engaged by the lift arm. In this regard, the stop plates 35 have a vertical dimension slightly less than the arc of travel of the lift arms at a point located adjacent the front end of the vehicle body.

As started out above, the safety device herein described is adapted to be used with various types of off highway front end loader type vehicles in which the operator's compartment is positioned between vertical lift arms. It will be noted from the foregoing description that my novel safety device is of simple and inexpensive construction, and is well adapted to be used on various kinds of off highway front end type loaders and provides a maximum amount of safety to an operator.

It will also be noted from the foregoing description that my novel safety device, while being of simple and inexpensive construction, also functions in a more efficient manner than any heretofore known comparable device.

While the preferred embodiment of the present invention have been described, it should be understood that various changes, adaptations, and modifications may be made therein without departing from the spirit of the invention and scope of the appended claims.

What is claimed is:

1. An off highway front end loader vehicle comprising a vehicle body having front and rear ends and having opposed sides,
    ground engaging wheel supporting the body for travel over the ground,
    a forwardly facing operator's compartment intermediate the ends of said vehicle,
    a pair of lift arms each being pivotally connected to said body adjacent the rear end thereof for vertical swinging movement thereto, said lift arms extending along the sides of said body passed the operator's compartment,
    means for raising and lowering said lift arms between raised and lowered positions,
    a safety device comprising a pair of similar vertically disposed gate members, means pivotally connecting each of said gate members to one side of the vehicle body forwardly of the operator's compartment for swinging movement of the gate members about a vertical axis between opened and closed positions, said gate members when in the closed position being disposed in obstructing relation with respect to the operator's compartment and preventing egress therefrom and said gate members having means thereon disposed in obstructing relation with respect to the lift arms and preventing vertical movement thereof when the gate members are in the opened position.

2. The vehicle as defined in claim 1 wherein said lift arm obstructing means comprises a pair of elongate, vertically disposed stop structures each being secured to one of said gate members and projecting upwardly therefrom, each stop structure of each gate member being disposed in obstructing relation with a lift arm when the associated gate members are in the opened position, and said stop structures being disposed out of obstructing relation with said lift arms when the gate members are in the closed position.

3. The vehicle as defined in claim 2 wherein each of said stop structures comprises a plate which is disposed in overlying obstructing relation with a lift arm when the latter is in a lowered position and the associated gate members are in the opened position, and each stop plate being disposed in underlying obstructing relation with a lift arm when the latter is in a raised position in the associated gate members in the opened position.

4. The vehicle as defined in claim 1 wherein said lift arm obstructing means comprises stop structures secured to each gate member and extending angular therefrom, said stop structures for each gate member being disposed in obstructing relation with a lift arm when the associated gate member is in the open position, and said stop structures being disposed out of obstructing relation with said lift arms when the gate members are in the closed position.

5. The vehicle as defined in claim 4 wherein said gate members are disposed in overlapped relation when in the closed position.

6. The vehicle as defined in claim 2 wherein said stop structures are disposed in substantially right angular relation with respect to the associated gate member.

* * * * *